(12) United States Patent
Chiba et al.

(10) Patent No.: US 8,778,161 B2
(45) Date of Patent: Jul. 15, 2014

(54) ELECTRODE BLOCK AND FLUID REFORMER USING THE ELECTRODE BLOCK

(75) Inventors: Masatake Chiba, Miyagi (JP); Ikuo Chiba, Miyagi (JP); Hisanori Takahashi, Miyagi (JP)

(73) Assignee: Sanko Kogyo Co., Ltd., Miyagi (JP)

( * ) Notice: Subject to any disclaimer, the term of this patent is extended or adjusted under 35 U.S.C. 154(b) by 175 days.

(21) Appl. No.: 13/147,754

(22) PCT Filed: Feb. 6, 2009

(86) PCT No.: PCT/JP2009/000471
§ 371 (c)(1),
(2), (4) Date: Aug. 3, 2011

(87) PCT Pub. No.: WO2010/089800
PCT Pub. Date: Aug. 12, 2010

(65) Prior Publication Data
US 2011/0290640 A1 Dec. 1, 2011

(51) Int. Cl.
*C02F 1/461* (2006.01)
*C02F 1/42* (2006.01)
*C02F 103/08* (2006.01)
*C02F 103/00* (2006.01)
*C02F 103/02* (2006.01)
*C02F 103/42* (2006.01)

(52) U.S. Cl.
CPC ......... *C02F 1/46109* (2013.01); *C02F 2103/08* (2013.01); *C02F 2201/4611* (2013.01); *C02F 2103/002* (2013.01); *C02F 2303/22* (2013.01); *C02F 2001/46157* (2013.01); *C02F 2303/04* (2013.01); *C02F 2201/4613* (2013.01); *C02F 2201/003* (2013.01); *C02F 2103/008* (2013.01); *C02F 2001/46152* (2013.01); *C02F 2201/4614* (2013.01); *C02F 2201/46135* (2013.01); *C02F 2103/023* (2013.01); *C02F 2001/46161* (2013.01); *C02F 2103/42* (2013.01); *C02F 1/42* (2013.01)
USPC ............ 204/660; 204/674; 205/742; 205/758

(58) Field of Classification Search
USPC ........... 204/742–761, 660–674; 205/742–761
See application file for complete search history.

(56) References Cited

U.S. PATENT DOCUMENTS

2006/0096853 A1* 5/2006 King .......................... 204/230.2

FOREIGN PATENT DOCUMENTS

| JP | 04-114783 A | 4/1992 |
|---|---|---|
| JP | 05-228475 A | 9/1993 |

(Continued)

OTHER PUBLICATIONS

Translation of JP 2004-34746 of Hayakawa, published Dec. 9, 2004.*

(Continued)

*Primary Examiner* — Nicholas A Smith
*Assistant Examiner* — Brian W Cohen
(74) *Attorney, Agent, or Firm* — Lucas & Mercanti, LLP

(57) ABSTRACT

The present invention provides an epoch-making fluid reforming device which requires a small installation site, avoids clogging of pipes, allows uniform on-site adjustment, does not use chemicals or minimizes chemicals ii any, enables germ treatment, and purifies and reforms every fluid including water. The fluid reforming device has (a) a container for fluid reforming having an inlet for introducing an unpurified fluid and an outlet for discharging a purified fluid; (b) a pair or a plurality of pairs of AC application electrodes stored in the container; (c) a cylindrical ground electrode surrounding the AC application electrodes; (d) a polarity switching circuit connected to the AC application electrodes for switching the polarities of the pair of electrodes; and (e) a constant current supply having a current detector for detecting current flowing between the AC application electrodes in fluid reforming, the constant current supply keeping a current value detected by the current detector constant.

4 Claims, 15 Drawing Sheets

(56) References Cited

FOREIGN PATENT DOCUMENTS

| | | |
|---|---|---|
| JP | 06-064792 U | 3/1994 |
| JP | 6304568 A | 11/1994 |
| JP | 07-021188 U | 1/1995 |
| JP | 08-001166 A | 1/1996 |
| JP | 08-155456 A | 6/1996 |
| JP | 2002 346838 A | 12/2002 |
| JP | 2004 344746 A | 12/2004 |
| JP | 2005-224789 A | 8/2005 |
| JP | 2006 061844 A | 3/2006 |
| JP | 2006-239688 A | 9/2006 |
| JP | 2006 305407 A | 11/2006 |

OTHER PUBLICATIONS

Translation of JP 2006-061844 of Matsumura, published Mar. 9, 2006.*

Translation of JP 2002-346838 of Karasawa, published Dec. 4, 2002.*

* cited by examiner

ELECTRODE BLOCK AND FLUID REFORMER USING THE ELECTRODE BLOCK

This application is a 371 of PCT/JP2009/000471 filed Feb. 6, 2009, which application is incorporated by reference herein.

BACKGROUND OF THE INVENTION

1. Field of the Invention

The present invention relates to a fluid reforming device for reforming, as well as tap water, various kinds of fluids (e.g., gray water, sewage water and the like) including heavily contaminated water containing electrolyte substances and organic substances as impurities (e.g., seawater containing water creatures which is used as ballast water for ships; washing water containing bacteria which has been used for washing seafood such as clams; and discharged water containing fats and organic substances included in milk given to calves in farms). More specifically, the invention relates to a fluid reforming device for reforming: tap water such as air-conditioner cooling water (including warm water) circulated in factories; water supplied to boilers, industrial water supplied to factories; drinking water; water used for humidifying room, and the like; gray water (water for flush toilets; renovated industrial waste water; rainwater, and the like); and sewage water such as industrial waste water, river water, and the like; and moreover, bath water of hot springs or 24-hour baths; well water; hard water; soft water; seawater containing sewage which is circulated to be used for aquaculture; and oils to be used repeatedly.

2. Description of Related Art

Cooling water for air conditioners in factories, which is an example of fluids to be reformed, is used in circulation, and dust, dirt, and the like enter the cooling water while it is circulated. Although insoluble dust and dirt are filtered and removed by a filter or the like during circulation, water-soluble substances in the dust or dirt are dissolved into the circulating water. Particularly, substances such as Ca and Mg are oxidized over time, and deposited and accumulated as scales in pipes, which causes clogging of equipment such as pipes and pumps. Further, various kinds of germs (e.g., *Escherichia coli, Legionella*, and respiratory bacteria that cause pneumonia or bronchitis) also grow in the circulating water. These germs are blown out from an air outlet into room, and cause diseases (diarrhea, stomach ache, and pneumonia). On the other hand, there are problems such as marine pollution caused by ballast water, pollution caused by washing water for seafood, and pollution caused by washing water containing fats and organic substances. The ballast water is seawater used as ballast for ships. Before a ship leaves a port empty, ballast tanks of the ship are filled with seawater at the port. When the ship is loaded with goods at a port of call, an equivalent amount of ballast water is discharged from the ship. The discharged seawater contains sea creatures from the port at which the ship left. Thus, the sea creatures are scattered as invasive species into the sea at the port of call, and adversely affect the ecosystem at the port of call.

Likewise, 24-hour baths or urban hot springs use circulated tap water or hot spring water, respectively, and the water quality is rapidly degraded due to propagation of: minerals that are originally contained in the water (particularly in the hot spring water); electrolytic substances (metal ion such as Na) or organic substances contained in sweat of bathing persons; falling bacteria; and germs discharged from the bathing persons. Likewise, the quality of seawater, which is circulated and used for aquaculture, is also gradually degraded due to wastes of fish kept in a tank, propagating germs, and mixed impurities, which causes a reduction in survival rate of cultured fish.

Reforming of industrial waste water or bath water of a large communal bath has conventionally been performed by adding chemicals (strong disinfectants (oxidizer) such as hypochlorous acid and potassium permanganate) or by using a large-scale aerator. However, these reforming ways have problems such as high cost and need for a large space, and therefore, are not convenient. In particular, it is impossible to add a strong disinfectant (oxidizer) or the like into water circulating in a large bath of an urban hot spring, or water in a home-use 24-hour bath, and it is difficult to introduce a large-scale treatment facility.

A fluid reforming device used for the above-described purposes instead of the large-scale treatment facility has been disclosed in, for example, Japanese Patent Nos. 2623204, 2611080, and 2615308. This device is applicable to the urban hot spring and the home-use 24-hour bath. In the treatment performed by this device, some of the organic compounds in the water are evaporated while the other are deposited, and the supernatant water becomes sterilized clean water, which is verified to be reusable.

BRIEF SUMMARY OF THE INVENTION

However, since this treatment adopts electrolysis in which a constant voltage is applied to AC application electrodes placed in target water, the amount of current that flows in the target water varies depending on the property of the target water. Therefore, it is necessary to perform current setting in accordance with the property of the target water, or change the current setting in accordance with the progress of the treatment. For example, heavily contaminated water contains a large amount of electrolytes, and therefore, allows current to flow easily therein. However, as reforming goes on, the electrolytes decrease and thereby the current becomes less likely to flow. Therefore, the applied voltage must be gradually increased in accordance with the progress of the treatment so that a predetermined amount of current flows constantly. When the target water is hard water, hard water contains a large amount of electrolytes as compared with soft water, and therefore, allows current to flow easily therein. Thus, the amount of current must be adjusted in accordance with the water quality. As described above, since the invention disclosed in the prior arts adopts the constant voltage system, current adjustment in accordance with the target water is required. Apart from a case where there are few construction sites, when many construction sites are established all over the country, current adjustment must be performed in accordance with the installation conditions at the individual construction sites. In this case, the conventional facility takes an extreme amount of time and labor for construction, and therefore, is not suitable for mass production and wide-area construction.

As the electrolysis for improving the water quality is advanced as described above, oxides caused by the electrolysis are gradually deposited on the electrode surface to gradually degrade the current conducting state. Therefore, conventionally, control for keeping the electrode surface clean is performed. However, Ca and Mg, which are main cause of the deposition of oxides, are dissolved in the water, and are gradually accumulated as oxides (scales) in the circulation pipes, resulting in clogging of the pipes and other equipment.

The present invention is made to solve the various problems at once, such as germs, installation sites, and particularly, clogging of pipes and other equipment, and adjustment of installation conditions for mass-production and wide-area installation. The present invention has an object to provide an epoch-making fluid reforming device which requires a small installation site, avoids clogging of pipes, allows uniform on-site adjustment, does not use chemicals or minimizes chemicals if any, enables germ treatment, and purifies and reforms (lowers oxidation-reduction potential) every fluid including water.

A first aspect in accordance with the present invention is directed to Embodiment 1 (refer to FIGS. 1(a), 1(b)) of an electrode block (30) for fluid reforming, which electrode block (30) is immersed in a target fluid to be subjected to reforming. The electrode block (30) includes: (a) a pair or a plurality of pairs of AC application electrodes (3a) (3b) which are placed in a target fluid to be subjected to reforming; (b) a ground electrode (3d) surrounding the AC application electrodes (3a) (3b), or placed between the AC application electrodes (3a) (3b); (c) a polarity switching circuit (2) connected to the AC application electrodes (3a) (3b), for switching the polarities of the AC application electrodes (3a) (3b); and (d) a constant current supply (1) having a current detector (SR) for detecting current that flows between the AC application electrodes (3a) (3b) in fluid reforming, the constant current supply keeping a current value detected by the current detector (SR) constant.

A second aspect in accordance with the present invention is directed to Embodiment 2 (refer to FIGS. 1(c) and 1(d)) of the electrode block (30). The electrode block (30) includes: (a) a set of three AC application electrodes (3a) (3b) (3c), the polarities of which are switched so that one of them is a positive electrode, another one is a negative electrode, and the other one is a ground electrode, and at least a set of three AC application electrodes being placed in a target fluid to be subjected to reforming; (b) a ground electrode (3d) surrounding the AC application electrodes (3a) (3b) (3c), or placed inside the AC application electrodes (3a) (3b) (3c); (c) a polarity switching circuit (2) connected to the AC application electrodes (3a) (3b) (3c), for switching the polarities of the AC application electrodes (3a) (3b) (3c); and (d) a constant current supply (1) having a current detector (SR) for detecting current that flows between the electrodes in fluid reforming, the constant current supply keeping a current value detected by the current detector (SR) constant.

A case where the electrode block (30) according to Embodiment 1 or 2 is placed in a container (10) for fluid reforming (refer to FIGS. 2 to 11), the electrode block (30) may be placed in the container (10) for fluid reforming which has an inlet (14) for introducing an unpurified fluid and an outlet (15) for discharging a purified fluid.

In the Embodiment 2, a set of three AC application electrodes (3a) (3b) (3c), each being bent in a V shape, may be arranged on a concentric circle, symmetrically with respect to a point. By successively selecting adjacent two of the AC application electrodes (3a) (3b) (3c) and turning on the selected electrodes, the surfaces of the electrodes are kept clean, and thus electrolysis performance can be maintained for a long time.

The electrodes (3a) (3b) (3c) (3d) may be formed of a porous material. Therefore, circulation of the fluid in the container (10) is smoothly carried out, and contact of the fluid to the electrodes (3a) (3b) (3c) (3d) is smoothly carried out. Thus, high electrolysis performance can be maintained.

According to the electrode block (30) of the present invention, which is disclosed in claim 1 or claim 2, a flowing target fluid (in claim 3, a target fluid that flows in the container (10)) or a target fluid stored in the batch type container (10) (refer to FIG. 6) contacts the AC application electrodes (3a) (3b), or (3b) (3c), or (3c) (3a), which are non-ground electrodes, and is subjected to electrolysis. Then, electrolyte impurities (mostly Ca, also Mg and Si) dissolved in the fluid are oxidized in the fluid as described later, and the oxides of the electrolyte impurities are deposited and accumulated on the surface of the ground electrode (3d). Thereby, deposition of electrolyte impurities in pipes, which have been dissolved in the circulating fluid such as air conditioner cooling water, is significantly reduced, and clogging of the pipes is resolved or significantly retarded. Also in the case of the batch type container (10), deposition of electrolyte impurities on the inner wall and the like of the body (11) is reduced. The ground electrode (3d) is replaced depending on the degree of contamination at the surface thereof.

The above-described electrolysis lowers the oxidation-reduction potential of the target fluid. However, active oxygen and active hydrogen caused by the electrolysis are partially dissolved in the target fluid, and the dissolved oxygen in the target fluid promotes oxidizing reaction of electrolyte impurities and organic substances (including germs) in the target fluid to detoxify them.

On the other hand, the active hydrogen in the target fluid dissolves sticky and gooey organic substances (proteolipid) attached to the surface and corners (particularly, the corners at the bottom where the target fluid is not circulated) of the body (11) of the container (10), and thereby keeps the inside of the container (10) clean. When the sticky organic substances are dissolved and removed, germs (particularly, *Legionella*) hidden in and behind the organic substances are dissolved and killed by the dissolved active oxygen.

In the present invention, since the current that flows between the AC application electrodes during fluid reforming is kept constant, the type of the target fluid is not limited. That is, a heavily contaminated fluid (i.e., contaminated water) or hard water containing a large amount of impurities or minerals, respectively, and therefore, efficiently conducts electricity and allows electrolysis to advance. When the purity of such target fluid is increased with the advance of electrolysis, the target fluid becomes less likely to conduct electricity and slows the electrolysis. By keeping the current constant, purification is performed by constant electrolysis regardless of the type of the target fluid. Accordingly, in contrast to the conventional art, the present invention does not require current adjustment for each installation site, and therefore, has an advantage in mass production and wide-area installation. In addition, since impurities (mostly Ca) in the fluid are deposited and accumulated on the ground electrode and removed, the impurities are prevented from depositing in equipment such as pipes and pumps, or containers. Furthermore, hazardous organics such as germs in various polluted water, contaminated water, ballast water and the like can be removed by the fluid reforming with electrolysis.

BRIEF DESCRIPTION OF THE DRAWINGS

FIG. 1 is a schematic diagram illustrating a case where the device of the present invention is applied to an aquaculture pond or the like.

FIG. 2 is a schematic diagram illustrating a case where the device of the present invention is applied to industrial wastewater treatment or the like.

FIG. 3 is a schematic diagram illustrating a case where the device of the present invention is applied to a cooling water piping system for air conditioning; or the like.

FIG. 4 is a schematic diagram illustrating a ease where the device of the present invention is applied to a 24-hour bath or the like.

Figure 1:
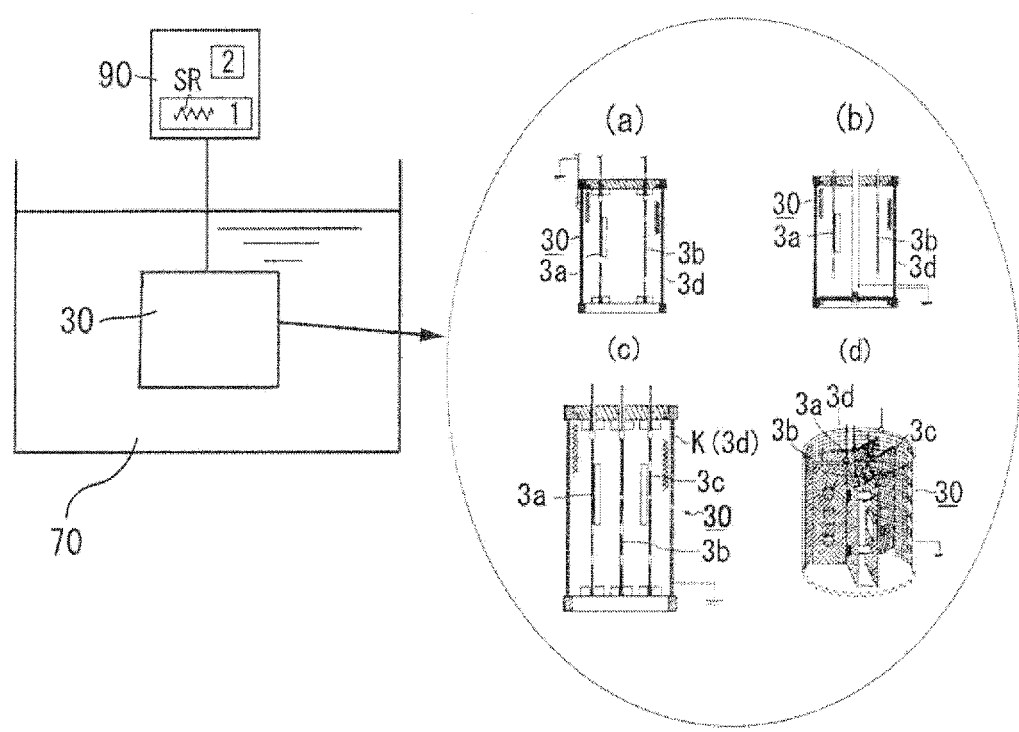

REFERENCE SIGNS LIST (1) constant current supply
(2) switching circuit
(3a), (3b), (3c) AC application electrodes
(3d) ground electrode
(10) container
(14) inlet
(15) outlet
(51) outgoing circulation pipe
(52) returning circulation pipe
(60) boiler
(70) bathtub
(80) heat exchanger
(SR) current detector

DESCRIPTION OF EMBODIMENTS

Figure 2:
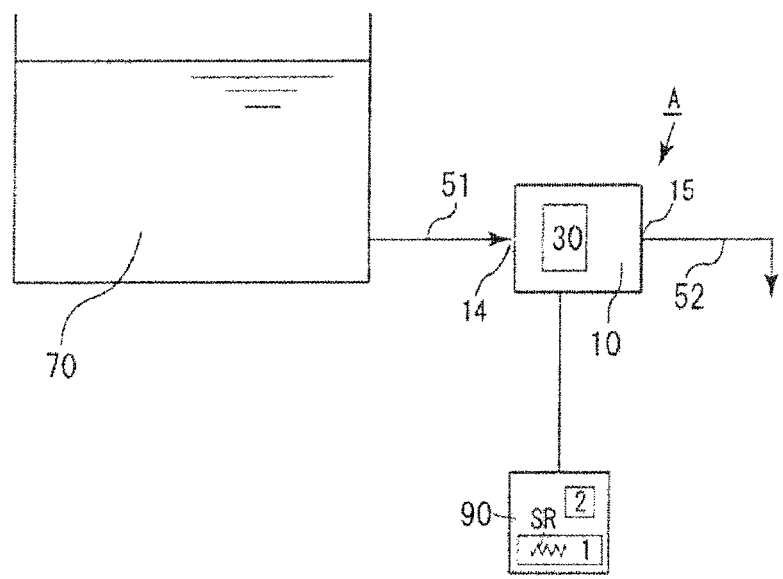
Figure 3:
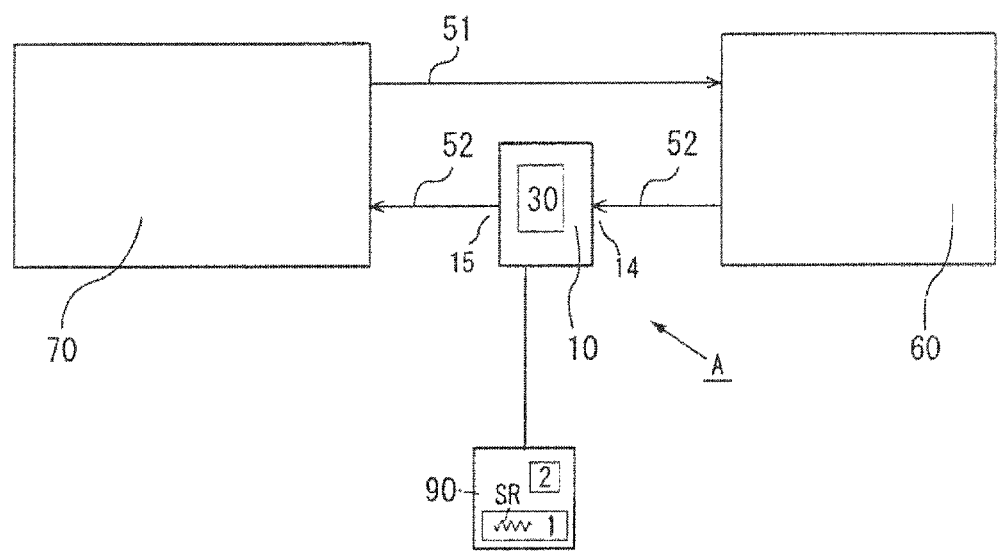
Figure 4:
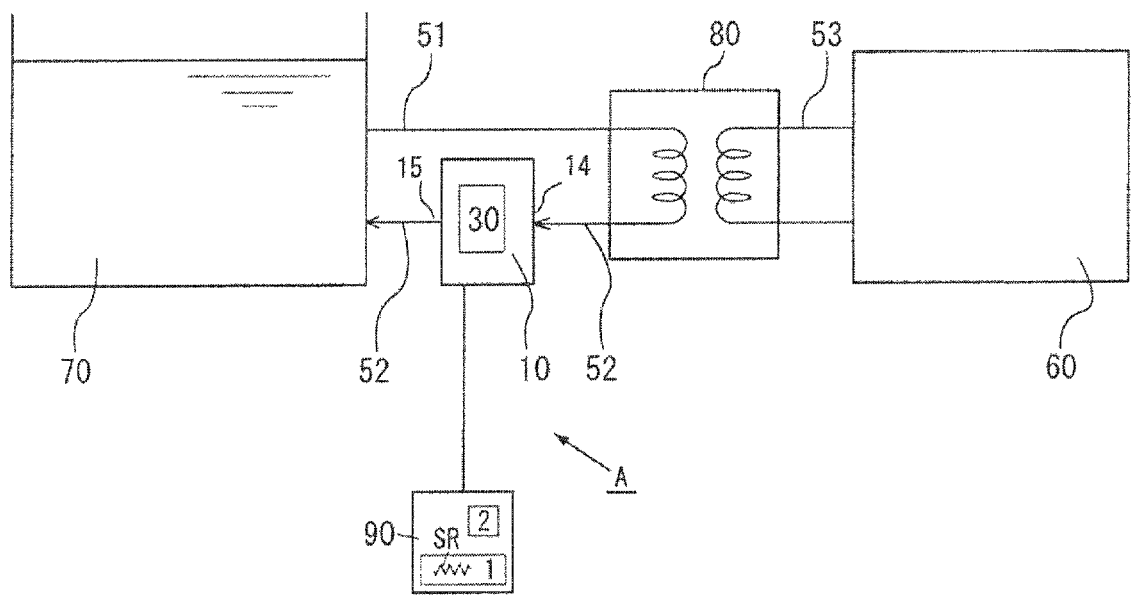

The present invention will be described by way of embodiments with reference to the drawings. FIG. 1 illustrates a case where fluid reforming is performed with an electrode block (30) of the present invention being directly placed in a target fluid. FIGS. 2 to 4 illustrate examples of installation of a fluid reforming device having the electrode block (30) of the present invention. In the case of FIG. 1, the target fluid is stored in a concave place (70) such as: an aquaculture pond; a water tank such as a lower tank or a water receiving tank of a cooling tower; a ballast tank of a ship; or a milk fat separation tank, and only the electrode block (30) of the present invention is immersed in the target fluid to purify and reform the target fluid. In the ease of FIG. 2, industrial waste water, lap water, well water, or gray water, which is a target fluid from a water source (70), is reformed, and the reformed clean water is supplied or discharged as it is. A fluid reforming device (A) is placed between pipes (51) (52). A high-frequency AC voltage generated by an AC generator (90) is applied to electrodes in a fluid-purifying container (10), and thereby a constant current flows in the target fluid. FIG. 3 illustrates, representatively, a circulation piping system for air conditioning, in which water is circulating between an air conditioner (70) and a cooling tower (or chiller) (60) installed outdoor, and the fluid reforming device (A) of the present invention is placed in middle of a pipe (52) connecting the air conditioner and the cooling tower. Alternatively, a combination of a bathtub (70) and a boiler (60) as a heat source is also considered. FIG. 4 illustrates an example of a 24-hour bath or an urban hot spring, in which hot water in the bathtub (70) and boiling water heated by the boiler (60) exchange heat via a heat exchanger (80), and the fluid reforming device (A) of the present invention is placed in the middle of a pipe (52) of the bathtub (70). Reference numeral (53) denotes a boiler pipe. In the cases shown in FIGS. 2 and 3, only the electrode block (30) shown in FIG. 1 may be used.

Figure 7:
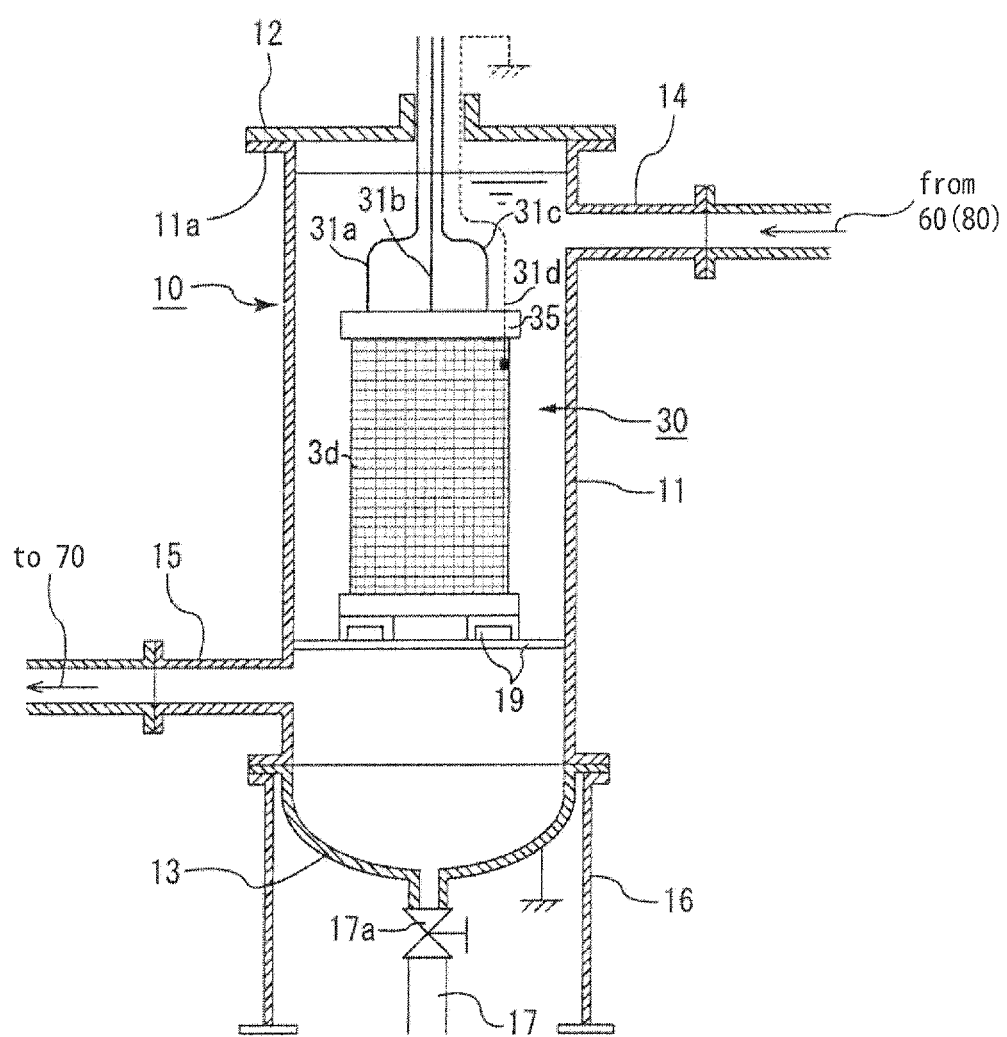
FIG. 7 is a cross-sectional view illustrating an example of the device of the present invention, which uses parallel plate-shaped electrodes.

Hereinafter, the present invention will be described with reference to a cooling water circulation system for air conditioning in a factory, which is a representative example of the present invention, shown in FIG. 3. FIG. 7 is a cross-sectional view of a container (10) of the fluid reforming device (A) of the present invention. Any of various electrode blocks (30) of the present invention, which are described in this specification, is stored in the container (10). The container (10) is composed of a cylindrical body (11), a semispherical bottom section (13) provided at a bottom of the body (11), and an upper lid (12). A flange (11a) is provided at an outer periphery of an upper opening of the body (11), and an outer peripheral part of the upper lid (12) is bolted to the flange (11a). A pipe-shaped inlet (14), which is communicated with the inside of the body (11), is provided on an upper side surface of the body (11), and a pipe-shaped outlet (15), which is communicated with the inside of the body (11), is provided on a lower side surface of the body (11) at the opposite side from the inlet (14). Examples of materials of the fluid purifying container (10) are, but not limited to, resins, ceramics, metals (including stainless) and the like. Most suitable one is used depending on the purpose. The fluid purifying container (10) made of stainless will be described as a representative example.

A drain pipe (17) is connected, via a drain valve (17a), to a central lowermost part of the bottom section (13) extending from the body (11), and sediments (mostly oxides of Ca, Mg, and Si, or other solids) deposited in the bottom section (13) are timely discharged through the drain valve (17a). Electrode support frames (19) are arranged in the middle stage in the container (10) so as to intersect with each other across the body (11), and the ends of the frames (19) are welded to an inner circumference surface of the container (10). Further, the bottom section (13) of the container (10) is fixed on support legs (16).

Figure 5:
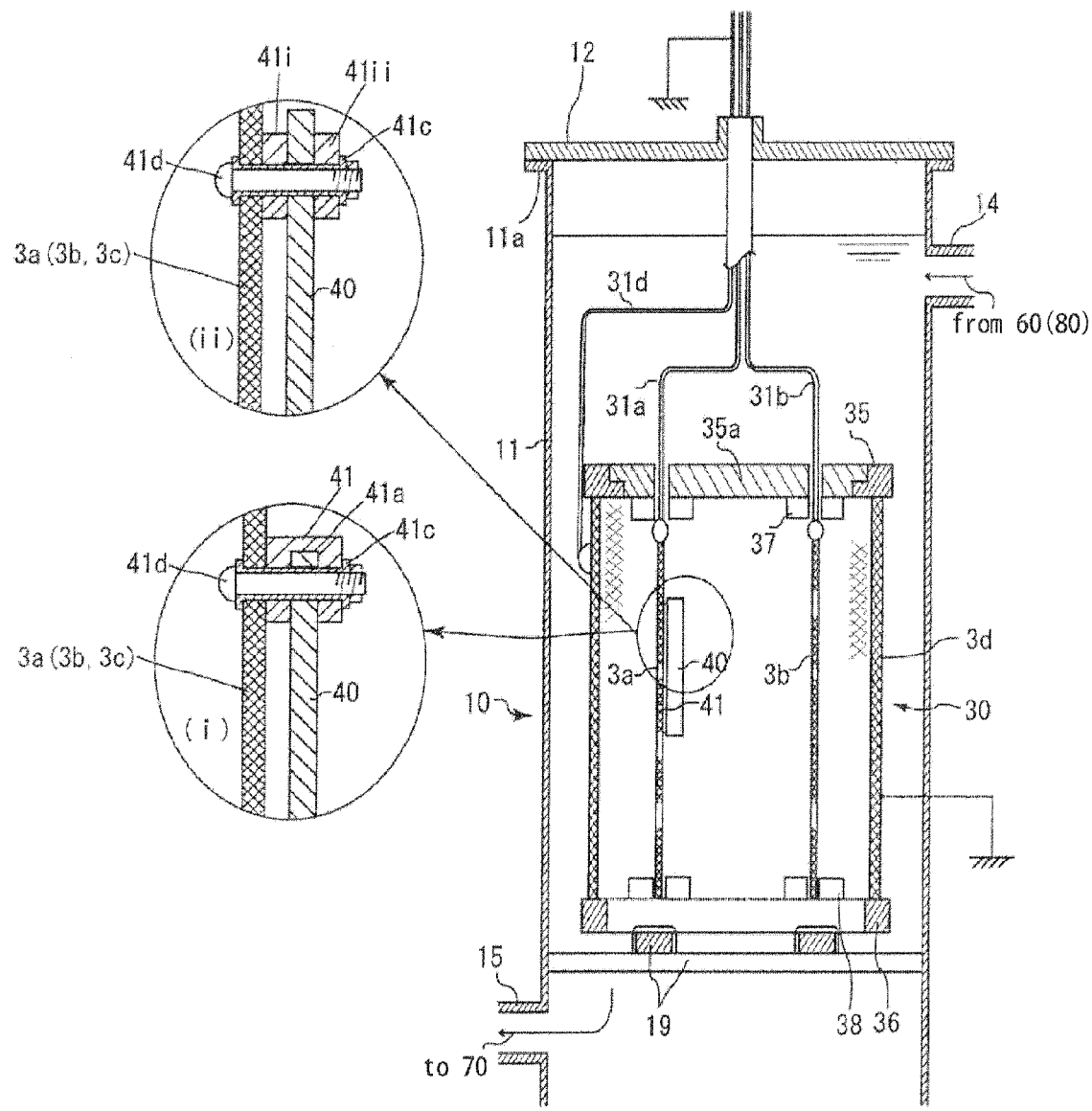
FIG. 5 is a cross-sectional view of a container for continuous treatment according to the first embodiment of the present invention.
Figure 6:
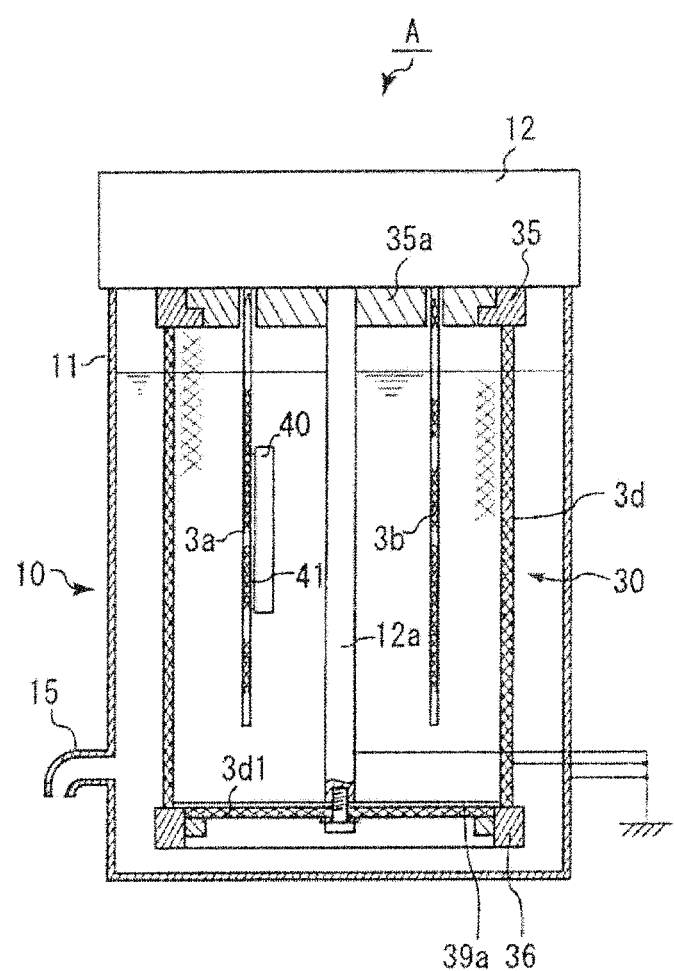
FIG. 6 is a cross-sectional view of a batch type container according to the first embodiment of the present invention.
Figure 12:
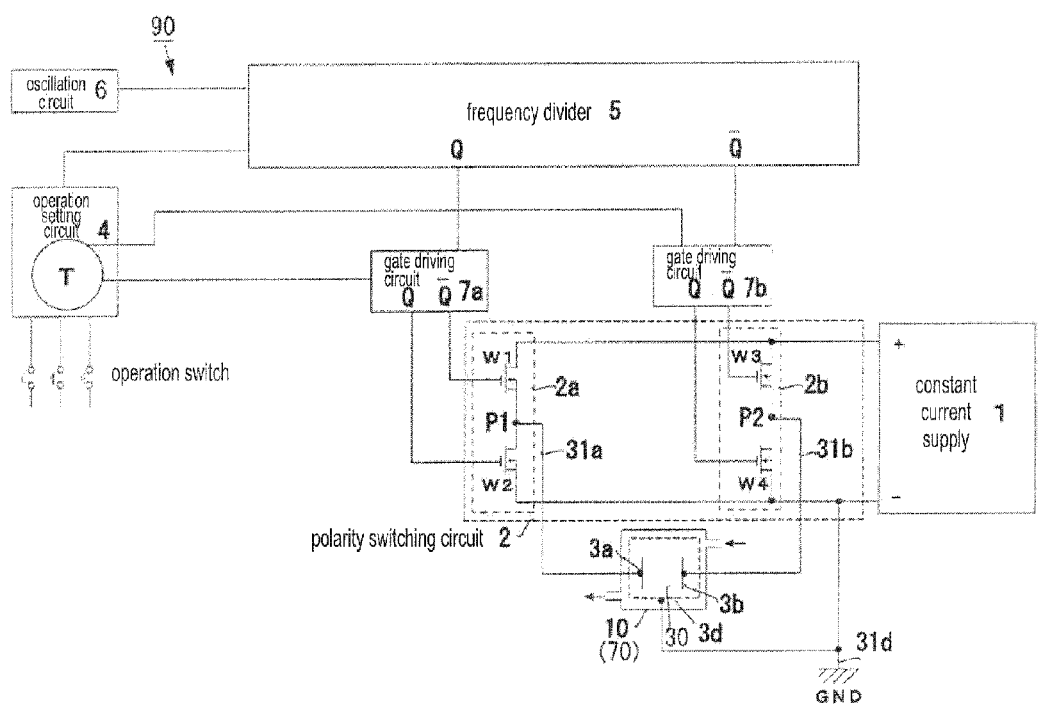
FIG. 12 is a block diagram illustrating the first embodiment of the present invention.

The simplest structure of electrodes of the present invention is shown in FIGS. 5 and 12. The electrode block (30) of the fluid reforming device of the present invention comprises: a pair of upper and lower resin rings (35) (36), each having a diameter slightly smaller than that of the container (10) and formed of a chemically nonreactive stable resin such as tetrafluoroethylene; a cylindrical ground electrode (3d) having the resin rings (35) (36) on its upper and lower ends, respectively; a pair of plate-shaped AC application electrodes (3a) (3b) which are arranged in parallel and opposed to each other in the cylindrical ground electrode (3d) (a plurality of pairs of AC application electrodes (3a) (3b) may be arranged); and a lid (35a) which is detachably fitted into the upper resin ring (35). Conductive wires (31a) (31b) (31d) are connected to the AC application electrodes (3a) (3b) and the cylindrical ground electrode (3d), respectively, and the conductive wires (31a) (31b) penetrate through the lid (35a). In FIG. 6, the conductive wires (31a) (31b) are provided inside the lid (12). In FIG. 5, fixing members (37) (38) for fixing the AC application electrodes (3a) (3b) are arranged on the upper and lower resin rings (35) (36), respectively, and thereby the AC application electrodes (3a) (3b) are fixed.

The electrodes (3a) (3b) (3d) [also electrodes (3a) (3b) (3c) (3d) described later] are each formed of a porous material such as a metal mesh, a perforated metal, or a metal lath, or a flat plate. In particular, the AC application electrodes (3a) (3b) [also AC application electrodes (3a) (3b) (3c) described later] are platinum plated. On either of the facing surfaces of the AC application electrodes (3a) (3b) [also AC application electrodes (3a) (3b) (3c) described later], a rectangle thick Mg block (40) is fixed through a fixing member (41) made of a chemically nonreactive stable resin such as tetrafluoroethylene. An example of a method for fixing the Mg block (40) is as follows. As shown in an enlarged view (i) in a circle in FIG. 5, an end of the Mg block (40) is fitted into a groove (41a) formed in the fixing member (41), and the Mg block (40) is fixed with a screw (41d) in a state where the Mg block (40) is insulated from the electrode (3a) [or (3b), (3c)] by an insulating pipe (41c). Another fixing method is shown in an enlarged view (ii). The Mg block (40) is provided between fixing members (41i) (41ii) made of a chemically nonreactive stable resin such as tetrafluoroethylene, and the Mg block (40) is fixed by a screw (41d) in a state where the Mg block (40) is insulated from the electrode (3a) [or (3b), (3c)] by an insulating pipe (41c) as described above. When the amount of electrolytes dissolved in the target fluid is insufficient, the Mg block (40) dissolves in the target fluid to promote initial electrolysis. As a material of the ground electrode (3d), titanium or stainless (for example, a plate, a perforated metal, or a porous plate) is used to avoid electric corrosion. The electrode block (30) thus constructed is placed on the electrode support frames (19) in the container (10).

As shown in FIG. 12, the AC application electrodes (3a) (3b) [also AC application electrodes (3a) (3b) (3c) described later] are connected to a polarity switching circuit (2), while the ground electrode (3d) is grounded (GND).

Figure 15:
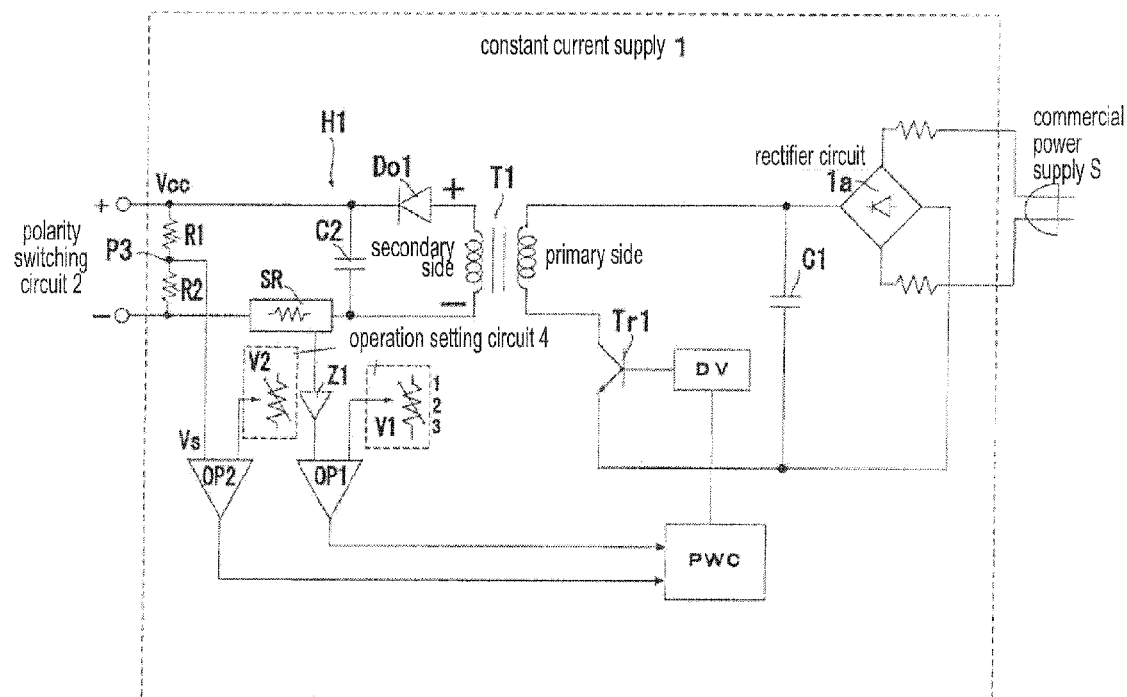
FIG. 15 is a block diagram illustrating a constant current supply of the device of the present invention.

FIG. 12 shows an example of a specific control circuit for the AC generator (90) according to Embodiment 1 shown in FIG. 5. FIG. 15 shows an example of a constant current supply (1) of the control circuit. Firstly, the control circuit shown in FIG. 12 will be described. The control circuit shown in FIG. 12 comprises an oscillation circuit (6), a frequency divider (5), an operation setting circuit (4), gate driving circuits (7a) (7b), a polarity switching circuit (2), and a constant current supply (1). The oscillation circuit (6) and the operation setting circuit (4) are connected to the frequency divider (5). The frequency divider (5) is connected to gates of switching elements (W1) to (W4) of the polarity switching circuit (2) via a pair of gate driving circuits (7a) (7b). Each of the switching elements (W1) to (W4) is implemented by an FET in which a current flows between a drain and a source when the gate potential is higher than the source potential.

Two of the switching elements (W1) to (W4), such as (W1) (W2) or (W3) (W4), are connected in series to form a pair of switching circuit section (2a) or (2b), respectively. The two pairs of switching circuit sections (2a) (2b) are connected in parallel to constitute the polarity switching circuit (2) [=FET bridge circuit]. Specifically, the sources of the switching elements (W1) (W3) are connected to the drains of the switching elements (W2) (W4) to form the switching circuit sections (2a) (2b). The drains of the switching elements (W1) (W3) of the switching circuit sections (2a) (2b) are connected to each other, and the sources of the switching elements (W2) (W4) are connected to each other. The gates of the switching elements (W1) to (W4) are connected to the gate driving circuits (7a) (7b).

The conductive wires (31a) (31b) extending from a connection point (P1) of the switching element (W1) (W2) and a connection point (P2) of the switching elements (W3) (W4) are connected to the AC application electrodes (3a) (3b), respectively. The positive terminal (+) of the DC constant current source (1) is connected to the drains of the switching elements (W1) (W3), while the negative terminal (−) thereof is connected to the sources of the switching elements (W2) (W4) and to the ground electrode (3d), and further, grounded (GND) through the conductive wire (31d).

In the present embodiment, the oscillation circuit (6) is implemented by a crystal oscillator having a frequency of 1.308 MHz (the frequency of the crystal oscillator is not limited thereto). A pulse generated by the oscillation circuit (6) is frequency-divided by the frequency divider (5) connected to the oscillation circuit (6) to synthesize a signal for the gate driving circuits. The conditions for frequency division depend on the setting by the operation setting circuit (4) described below.

Figure 13:
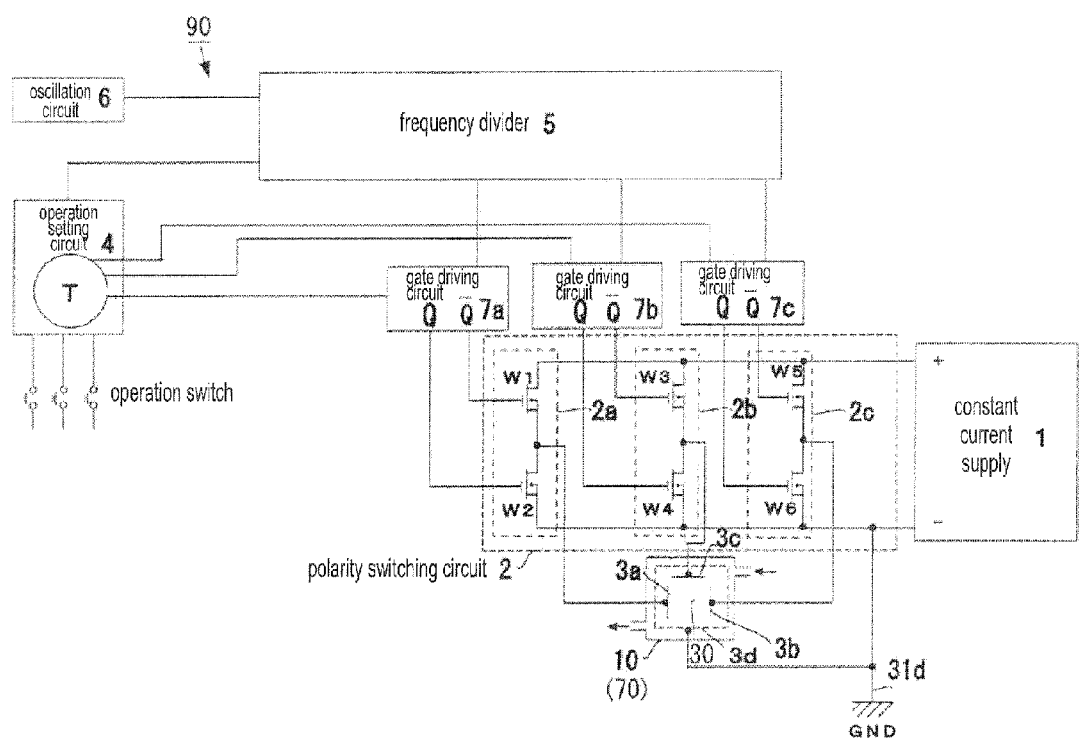
FIG. 13 is a block diagram illustrating the second embodiment of the present invention.
Figure 14:
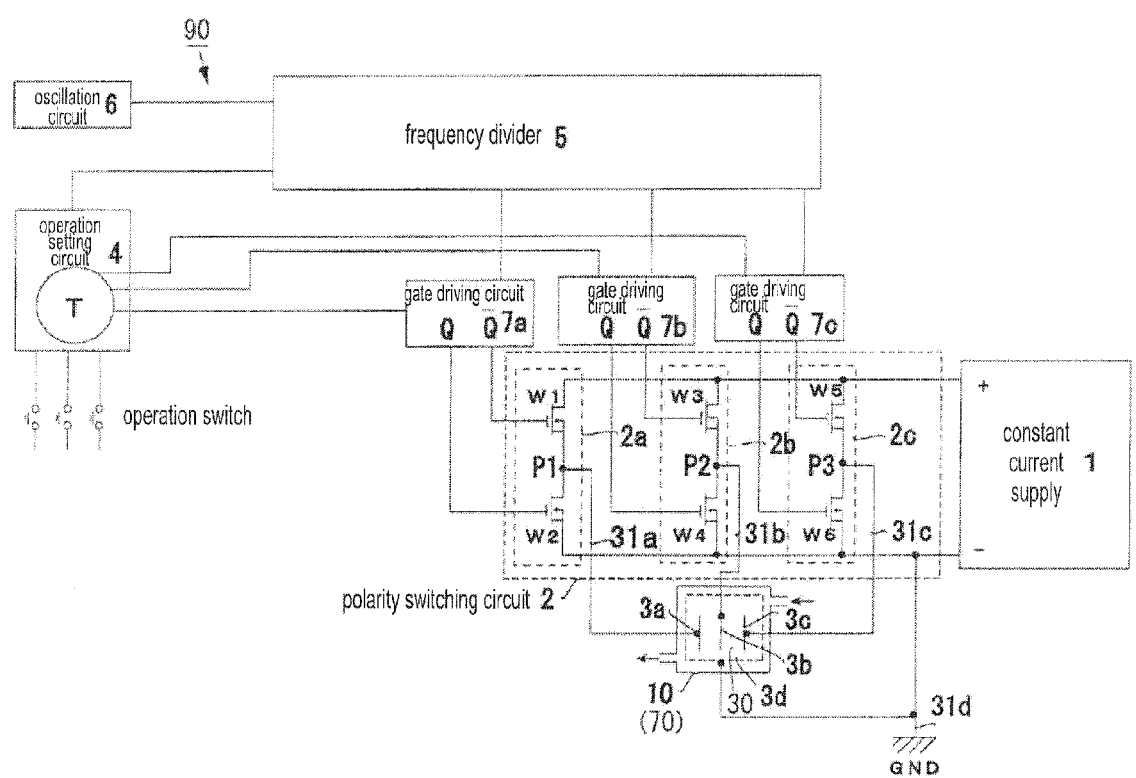
FIG. 14 is a block diagram illustrating a modification of the second embodiment of the present invention.

The operation setting circuit (4) determines circuit operation setting in accordance with the electrode specification. A mode corresponding to the two-electrode two-phase driving system (FIG. 12) or a mode corresponding to the three-electrode three-phase driving system (FIG. 13 or 14) is designated by using an operation switch, thereby setting the operation of the frequency divider (5). Specifically, the crest values, wave numbers, and duty ratios (symmetric or asymmetric) at the positive side and the negative side of the AC waveform applied to the electrodes (3a) (3b) or the electrodes (3a) (3b) (3c) are designated. In the present embodiment, the crest values, wave numbers, and duty ratios (symmetric or asymmetric) at the positive side and the negative side of the AC waveform are symmetric, but the present invention is not limited thereto.

The frequency divider (5) receives the pulse from the oscillation circuit (6) as a reference signal, and frequency-divides the pulse in accordance with the signal from the operation setting circuit (4) to generate a pulse signal for the gate driving circuits. Specifically, firstly, the frequency divider (5) frequency-divides the reference signal from the oscillation circuit (6) on the basis of an operation mode instruction from the operation setting circuit (4) to generate a required timing pulse. The polarity conversion period (the positive/negative switching period) and the pulse width (the current flowing time) of the electrodes (3a) (3b) [or the electrodes (3a) (3b) (3c) in the case of three-electrode driving described later] can be changed by changing the frequency division ratio. In the embodiment shown in FIG. 5, since the two-electrode two-phase driving system is adopted, mutually inverted pulses are supplied to the gate driving circuits (7a) (7b), respectively. In the three-electrode three-phase driving system using the AC application electrodes (3a) (3b) (3c) described later, 120° phase-shifted pulses are supplied to the gate driving circuits (7a) (7b) (7c), respectively. The amount of phase shift is not limited to 120°. The same effect can be achieved by the phase shift. This point is common throughout the description.

The gate driving circuits (7a) (7b) convert the signals from the frequency divider (5) to gate signals for the switching elements (W1) (W2) of the switching circuit section (2a) and the switching elements (W3) (W4) of the switching circuit section (2b), respectively. In the case of the two-electrode two-phase driving system, 180° inverted two pulses are generated and outputted at a predetermined timing to the gates of the switching elements (W1) (W2) of the switching circuit section (2a) and the gates of the switching elements (W3) (W4) of the switching circuit section (2b), respectively. The inverted pulses are not limited to 180° inverted pulses. The same effect can be achieved also by the phase shift. This point is common throughout the description.

The constant current supply (1) is illustrated in FIG. 15. Specifically, the constant current supply (1) comprises: a rectifier circuit (1a) having a diode bridge structure, which is connected to a commercial power supply (S); a transformer (T1) having one terminal on the primary side, which is connected to an output terminal of the rectifier circuit (1a); a chopping element (Tr1) having a collector connected to the other terminal of the transformer (T1), and an emitter connected to an input terminal of the rectifier circuit (1a); a capacitor (C1) provided between the output terminal and the input terminal of the rectifier circuit (1a); a driver circuit (DV) for driving the chopping element (Tr1), which is connected to a base of the chopping element (Tr1); a pulse width control circuit (PWC) for chopping-controlling the driver circuit (DV); a smoothing circuit (H1) composed of a diode (Do1) provided on the positive (+) line side on the secondary side of the transformer (T1), and a smoothing capacitor (C2) provided between the positive (+) and negative (−) lines on the secondary side; voltage-division resistors (R1) (R2) provided between the positive (+) and negative (−) lines on the secondary side; a voltage control comparator (OP2) having an input terminal connected to a connection point (P3) of the voltage-division resistors (R1) (R2); and an applied voltage reference potential output section (V2) connected to a reference potential input terminal as another input terminal of the voltage control comparator (OP2). An output terminal of the voltage control comparator (OP2) is connected to the pulse width control circuit (PWC). The applied voltage reference potential output section (V2) is implemented by a variable resistor so that the maximum voltage applied to the electrodes (3a) (3b) [or the electrodes (3a) (3b) (3c) described later] can be controlled according to need.

An output voltage from a current detector (SR) is connected to an input terminal of a current control comparator (OP1) via an amplifier (Z1), and a current control reference potential output section (V1) is connected to a reference potential input terminal as another input terminal of the current control comparator (OP1). The output terminal of the current control comparator (OP1) is also connected to the pulse width control circuit (PWC). The current control reference potential output section (V1) is also implemented by a variable resistor so that the reference voltage (i.e., the inter-electrode current) can be controlled according to need. The reference potential output sections (V1) (V2) are included in the operation setting circuit (4), and an operator is allowed to operate the same according to need. The input and output terminals (−) and (+) of the constant current supply (1) are connected to the polarity conversion switching circuit (2), and a predetermined constant current is constantly supplied to the electrodes (3a) (3b) [or the electrodes (3a) (3b) (3c) described later]. In the embodiment shown in FIG. 12, the constant current is supplied to the electrodes (3a) (3b). In the three-electrode system shown in FIG. 1, the constant current is supplied to the electrodes (3a) (3b) (3c).

Next, the function of the embodiment shown in FIG. 5 (two-electrode system) will be described, taking a cooling water piping system for air conditioning in FIG. 3 as an example. The embodiment shown in FIG. 8 (three-electrode system), which is similarly applicable, will be described later. The container (10) is attached to the pipe (52) connecting the air conditioner (70) and the cooling tower (60). Water flows in the body (11) as the container body. When the fluid reforming device is turned on, gate driving signals, which are 180° phase-shifted from each other, are output from the frequency divider (5) to the gate driving circuits (7a) (7b) in a period set by the operation setting circuit (4). That is, when a gate driving signal is input to the gate driving circuit (7a), a signal is output from the gate driving circuit (7a) to the gate of the switching element (W1), and thereby the switching element (W1) is turned on. Since no signal is output to the other switching element (W2) which is paired with the switching element (W1); the switching element (W2) remains off. As a result, current flows from the switching element (W1) through the connection point (P1) to the electrode (3a).

A gate driving signal, which is 180° phase-shifted, is sent to the other gate driving circuit (7a), and a signal is sent to the gate of the switching element (W4) to turn on the switching element (W4). Since no signal is sent to the switching element (W3) which is paired with the switching element (W4), the switching element (W3) remains off. As a result, current flows from the electrode (3a) to the electrode (3b) and passes through the connection point (P2) and the switching element (W4) to return to the minus terminal of the constant current supply (1).

Since the ground electrode (3d), which is arranged surrounding the electrodes (3a) (3b), is always grounded and the negative electrode (3b) is also grounded, these electrodes (3d) (3b) are of the same potential, and current also flows from the positive electrode (3a) to the ground electrode (3d). This state continues for a period of time that is set on a timer (T) of the operation setting circuit (4). When the set time has passed, the signals sent from the gate driving circuits (7a) (7b) to the switching elements (W1) to (W4) are inverted, and thereby the current flowing direction is reversed. That is, the signal from the gate driving circuit (7b) is not input to the switching element (W4) but is input to the switching element (W3). Then, the current from the constant current supply (1) flows from the switching element (W3) through the connection point (P2) to the electrode (3b→3a) whose polarity has just been changed from negative to positive. On the other hand, the signal from the gate driving circuit (7a) is input to the switching element (W2) but is not input to the switching element (W1). As a result, the electrode (3a) whose polarity has just been positive is changed to a negative electrode, and current flows from the electrode (3b→3a) to the electrode (3a→3b) and passes through the connection point (P1) and the switching element (W2) to return to the constant current supply (1). Further, as described above, a portion of the current from the electrode (3b→3a) also flows to the ground electrode (3d). Thus, polarity switching between the electrodes (3a) (3b) is performed in accordance with the polarity switching period of the operation setting circuit (4), and thereby electrolysis of the fluid is performed.

The electrolysis causes the electrolytes in the fluid to be deposited on the negative (−) side electrode and the ground electrode (3d). However, since the polarities of the electrodes (3a) (3b) are switched at high speed, the deposits on the surface of each electrode break away when the polarity of the electrode is changed to positive. As a result, the electrolytes are not deposited on the electrodes (3a) (3b) but are deposited on the ground electrode (3d). Accordingly, it is possible to continue the electrolysis over a long time until the deposits finally cause the current not to flow toward the ground electrode (3d). When a predetermined amount of deposits are accumulated on the ground electrode (3d), the fluid reforming device is turned off to replace the ground electrode (3d).

As described above, a fluid containing electrolytes is subjected to electrolysis. However, the amount of electrolytes varies from fluid to fluid, or the amount of electrolytes decreases with the advance of electrolysis and thereby the amount of current flowing in the fluid varies. Such variation in the amount of current considerably affects mass production and wide-area installation of the fluid reforming device of the present invention, as described above. So, in the constant current supply (1), the current detector (SR) detects the amount of current that flows between the electrodes (3a) (3b) to keep the current constant.

That is, the current that flows between the electrodes (3a) (3b) is detected by the current detector (SR). When the current flowing between the electrodes (3a) (3b) flows into the current detector (SR) which is implemented by a resistor, a voltage (referred to as a sense voltage, hereinafter) is generated. The sense voltage is amplified by an amplifier (Z1) [not required if the sense voltage is sufficiently high], and then input to the input terminal of the current control comparator (OP1) to be compared with the voltage of the current control reference voltage output section (V1). When these voltages are of the same potential, it means that the amount of current set by the operation setting circuit (4) flows between the electrodes (3a) (3b).

However, if the potential supplied from the current detector (SR) to the input terminal of the current control comparator (OP1) is lower than the potential of the current control reference voltage output section (V1), it is determined that the amount of current that flows between the electrodes (3a) (3b) is smaller than the amount of current that is set by the operation setting circuit (4). Then, a current increasing signal is supplied from the output terminal of the current control comparator (OP1) to the pulse width control circuit (PWC).

On receipt of this signal, the pulse width control circuit (PWC) instructs the driver circuit (DV) to increase its pulse width so as to extend the ON time of the chopping element (Tr1). Thereby, the ON time of the chopping element (Tr1) is extended, and the current that flows on the primary side of the transformer (T1) increases. With the increase in the current that flows on the primary side of the transformer (T1), the current that flows on the secondary side of the transformer (T1) also increases in proportion thereto. The current increasing operation is performed until reaching the reference potential of the current control reference voltage output section (V1).

When the fluid flows in the container (10) at a constant speed, the amount of electrolytes does not vary significantly. However, when the fluid in the container (10) does not flow because the container (10) is of the batch type, the amount of electrolytes decreases and the current becomes less likely to flow with the advance of electrolysis, and thereby the potential on the secondary side of the transformer (T1) gradually increases. Assuming that the potential on the secondary side of the transformer (T1) is (Vcc), a divided voltage (Vs) applied to the voltage control input terminal of the voltage control comparator (OP2) is [Vcc×R2/(R1+R2)], and compared with the reference voltage of the applied voltage reference potential output section (V2). A voltage increasing signal is transmitted to the pulse width control circuit (PWC) until the voltage (Vs) applied to the voltage control input terminal becomes equal to the reference voltage of the applied voltage reference potential output section (V2) so as to increase the current flow. However, the voltage (Vs) applied to the voltage control input terminal cannot exceed the reference voltage of the applied voltage reference potential output section (V2).

Conversely, if the fluid contains an excessive amount of electrolytes, excess current flows between the electrodes (3a) (3b). Then, the voltage supplied from the current detector (SR) to the input terminal of the current control comparator (OP1) becomes higher than the potential of the current control reference voltage output section (V1), and a current decreasing signal is output from the current control comparator (OP1) to the pulse width control circuit (PWC).

On receipt of the current decreasing signal, the pulse width control circuit (PWC) instructs the driver circuit (DV) to shorten its pulse width so as to reduce the ON time of the chopping element (Tr1). Thereby, the ON time of the chopping element (Tr1) is reduced, and the current that flows on the primary side of the transformer (T1) decreases. With the decrease in the current that flows on the primary side of the transformer (T1), the current that flows on the secondary side of the transformer (T1) also decreases in proportion thereto. The current decreasing operation is performed until reaching the reference potential of the current control reference voltage output section (V1). Simultaneously, the potential on the secondary side of the transformer (T1) is gradually lowered with the current decreasing operation, and a voltage decreasing signal is transmitted to the pulse width control circuit (PWC) to make the current less likely to flow.

As described above, the fluid is reformed by electrolysis, that is, the electrolyte impurities contained in the fluid are caused to deposit on the ground electrode (3d) to prevent the electrolyte impurities from depositing in the pipes through which the fluid is circulated. Since the electrolysis is performed under constant current control, the current that flows between the electrodes (3a) (3b) is constant even when the amount of electrolytes contained in the fluid is excessively large or small, or varies. Therefore, any fluid (seawater or oil as well as water) can be treated with a single current setting, and a fluid reforming device can be used in factory sites across the country. Moreover, in parallel with the fluid reforming by electrolysis, impurities in the fluid can be deposited and accumulated on the ground electrode and removed. Therefore, clogging of the pipe system is avoided or significantly reduced, and thus the maintainability can be significantly enhanced.

As described above, FIG. 1 shows the case where only the electrode block (30) is immersed in the fluid stored in the aquaculture pond (70) or the lower tank (70) of the cooling tower. In the electrode block (30), the AC application electrodes (3a) (3b) [or the AC application electrodes (3a) (3b) (3c)] and the ground electrode (3d) are arranged. In the former case, the ground electrode (3d) is placed between the AC application electrodes (3a) (3b), and impurities are deposited and accumulated on the ground electrode (3d). So, the ground electrode (3d) should be replaced. In the latter case using the multiple electrodes (3a) (3b) (3c), the ground electrode (3) is a porous cylindrical body surrounding the electrodes, or a porous cylindrical body placed so as to be surrounded by the electrodes. The ground electrode (3) is not limited to the porous cylindrical body, but may be a solid body or a plate. In FIG. 1, a diagram on the right side, which is enclosed in a circle, shows the case where a porous cylindrical body is used. The driving system using the electrodes (3a) (3b) (3c) will be described later. The two-electrode driving system is as described above. In this case, part (c) in the circle of FIG. 1 shows a member (K) surrounding the electrodes (3a) (3b) (3c). Of course, in the case of using the multiple electrodes (3a) (3b) (3c), the member surrounding the electrodes (3a) (3b) (3c) is the ground electrode (3d). Accordingly, in the latter case, the character in part (c) of FIG. 1 is not (K) but (3d).

Figure 8:
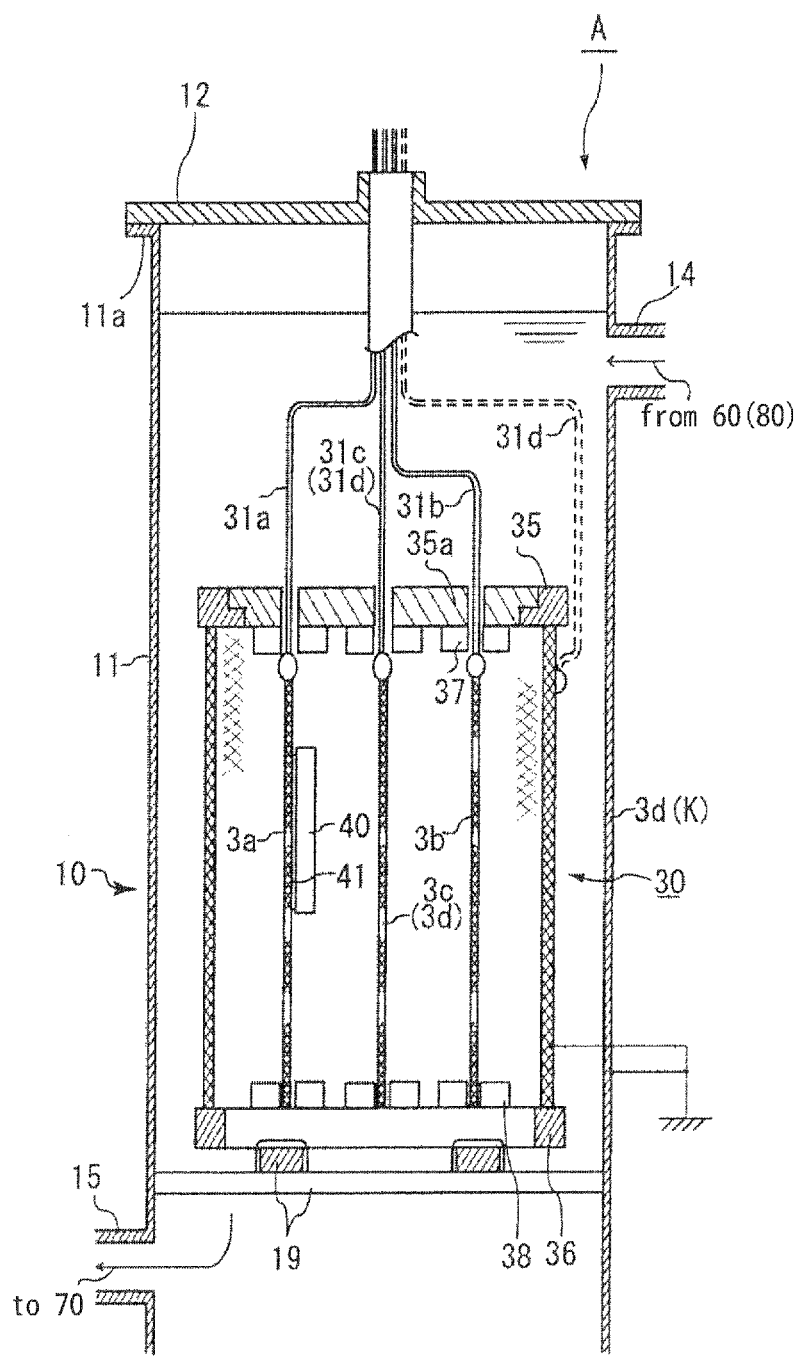
FIG. 8 is a cross-sectional view of FIG. 7.
Figure 9:
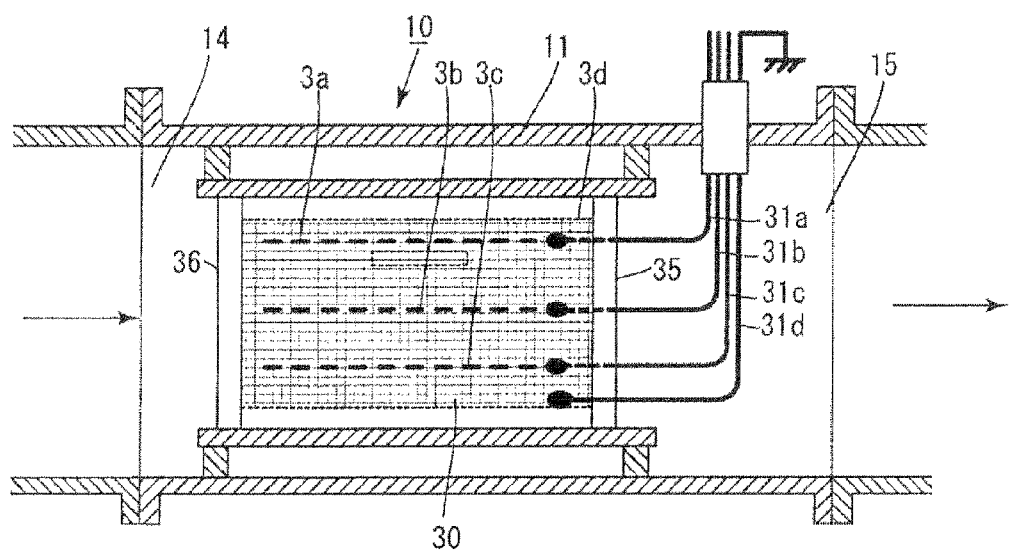
FIG. 9 is a cross-sectional view of a pipe connection type container of the device of the present invention.

FIG. 2 shows a case where the fluid reforming device is used for purifying industrial waste water, ballast seawater, sewage water used for washing seafood, sewage water containing fat, or the like, in which the electrode block (30) is installed according to the purpose as shown in FIGS. 7 to 9. The type of the electrode block (30) to be used is shown in FIG. 1. FIG. 4 shows a case of an urban hot spring or a 24-hour bath, in which a bathtub (70) and a boiler (60) are connected via a heat exchanger (80).

FIG. 6 shows a case where a target fluid is purified in a batch type fluid reforming device, and the device is used as a home-use water purifier, for example. FIG. 6 is structurally identical to FIG. 5. The AC application electrodes (3a) (3b) [or the AC application electrodes (3a) (3b) (3c) which are not shown] are supported in the lid (12). A support rod (12a) hangs down from the center of the lid (12), and an earth bar (39a) is provided at a lower end of the support rod (12a) and connected to the cylindrical ground electrode (3d). The earth bar (39a) is screwed to the lower end of the support rod (12a) together with the lower ground electrode (3d1) which is fitted in the lower resin ring (36).

Figure 10:
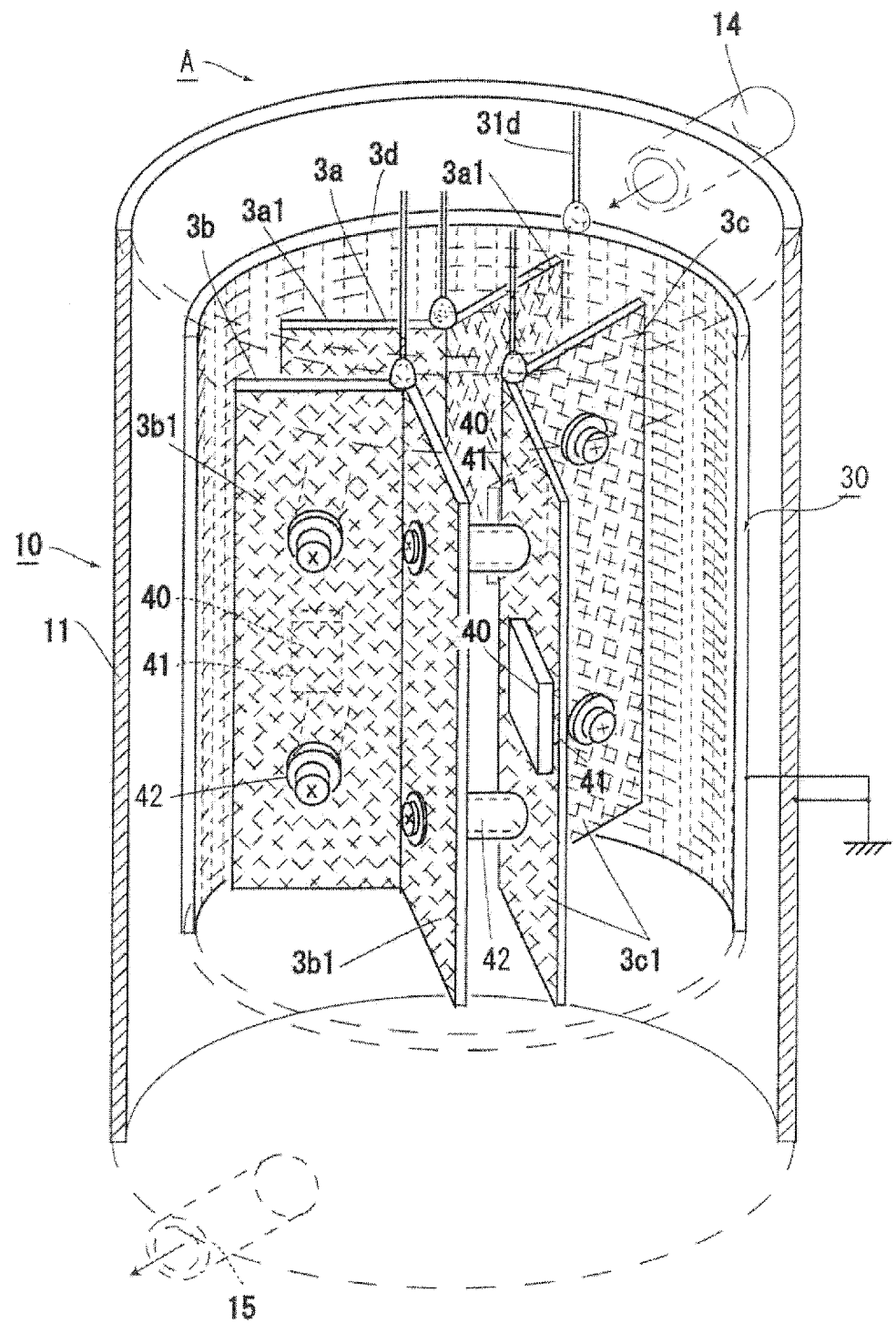
FIG. 10 is a partially exploded perspective view according to the second embodiment of the present invention.
Figure 11:
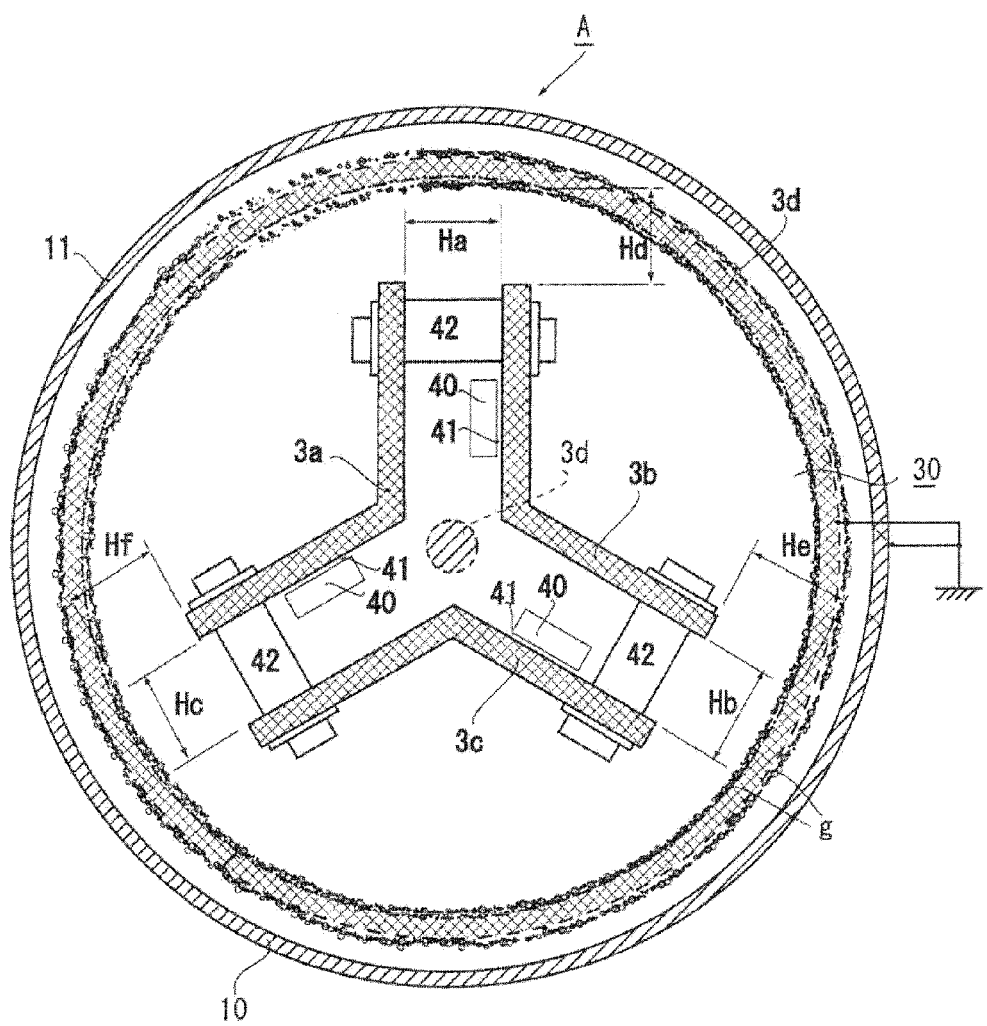
FIG. 11 is a cross-sectional view of FIG. 10.

Next, the case of using multiple electrodes will be described with reference to FIGS. 8 to 11. The same components as those of Embodiment 1 are designated by the same reference characters, and the description thereof will be omitted. FIGS. 10 and 11 show an example where a set of V-shaped AC application electrodes (3a) (3b) (3c) are arranged in the cylindrical ground electrode (3d), and FIG. 8 shows another example in which parallel plate electrodes (3a) (3b) (3c) are used. The structure shown in FIG. 8 is, assuming that the center electrode is the ground electrode (3d), a two-electrode two-phase driving system which uses the cylindrical ground electrode (3d) and the center plate ground electrode (3d).

Hereinafter, some embodiments are explained with FIGS. 8, 10, 11, and 13. As described above, FIG. 8 shows an example using parallel plate electrodes (3a) (3b) (3c), and FIGS. 10 and 11 show an example using V-shaped electrodes (3a) (3b) (3c). In Embodiment 2, a set of three AC application electrodes (3a) (3b) (3c) are used, and the polarities of the AC application electrodes are switched so that one of them is a positive electrode, another one is a negative electrode, and the other one is a ground electrode. These AC application electrodes (3a) (3b) (3c) are placed inside the cylindrical ground electrode (3d). In this case, three gate driving circuits (7a) (7b) (7c) lead from the frequency divider (5) to the corresponding AC application electrodes (3a) (3b) (3b), and are connected to the gates of switching elements (W1) to (W6) in a polarity switching circuit (2) for switching the polarities of the AC application electrodes (3a) (3b) (3c). Then, gate driving signals, which are 120° shifted from each other, are output from the frequency divider (5) to the gate driving circuits (7a) (7b) (7c). Thereby, as described in Embodiment 1, two of the three AC application electrodes (3a) (3b) (3c) are paired and supplied with AC at a timing set by the timer (T), while the remaining one electrode is grounded. In this way, the two electrodes to be paired, among the AC application electrodes (3a) (3b) (3c), are successively changed at the predetermined timing, the AC application electrodes (3a) (3b) (3c) are always kept clean, and impurities are deposited and accumulated on the constantly-grounded ground electrode (3d). Thus, clogging of pipes due to deposition and accumulation of impurities can be avoided.

In the case of FIGS. 10 and 11, the AC application electrodes (3a) (3b) (3c) are each formed by bending, in a V shape in a cross section, a porous plate such as a perforated metal or an expanded metal, and are arranged so that the plate parts (3a1) (3b1) (3c1) of the adjacent AC application electrodes (3a) (3b) (3c) are opposed to each other. The ground electrode (3d) surrounds the periphery of the AC application electrodes (3a) (3b) (3c). The plate parts (3a1) (3b1) (3c1) are screwed through insulating members (42). The distances (Ha) to (Hc) between the plate parts (3a1) (3b1) (3c1) and the distances (Hd) to (Hf) between the ground electrode (3d) and the plate parts (3a1) (3b1) (3c1) are equal to each other. Instead of the ground electrode (3d) surrounding the periphery of the AC application electrodes (3a) (3b) (3c) as shown by broken lines in FIG. 10, a cylindrical body (or a solid porous body) of a ground electrode (3d) may be arranged in the center of the AC application electrodes (3a) (3b) (3c). In FIG. 1, impurities (g) are deposited and accumulated on the surface of the cylindrical ground electrode (3d). Impurities are deposited not only on the cylindrical ground electrode but also on all the ground electrodes (3d).

Since the present invention uses the constant current supply (1), even if the distances (Ha) to (Hc) between the AC application electrodes (3a) (3b) (3c) and the distances (Hd) to (Hf) between the ground electrode (3d) and the AC application electrodes (3a) (3b) (3c) are not equal to each other, a set constant current flows between the electrodes. Thus, it is easy to set a constant current even when three electrodes are used. In other words, three or more electrodes may be used. Alternatively, a plurality of sets of electrodes, each set comprising three or more electrodes, may be combined and arranged in a single ground electrode (3d). Thus, a large-scale device is realized. In FIGS. 5 and 7 to 10, the fluid flowing direction is not limited to the illustrated one, but the fluid may be caused to flow in the reverse direction.

The invention claimed is:

1. An electrode block comprising:
   (a) a set of three AC application electrodes, each being bent in a V shape, arranged on a concentric circle, symmetrically with respect to a point, being placed in a target fluid to be subjected to reforming;
   (b) a ground electrode surrounding the AC application electrodes or placed inside the AC application electrodes;
   (c) a polarity switching circuit comprising three switching circuits connected in parallel, each of the three switching circuits having a pair of switching elements connected in series at a connecting point, one of each the three AC application electrodes connected to one of each connecting point of one of each pair of switching elements;
   (d) three driving gate circuits, one of each of the three driving gate circuits connected to one of each pair of switch elements for switching;
   (e) an operation setting circuit connected to each of the three driving gate circuits for switching the pair of switching elements and setting polarity of the three AC application electrodes in accordance with the electrode specification, so that a first one of the AC application electrodes is a positive electrode, a second one of the AC application electrodes is a negative electrode, and a third one of the AC application electrodes is a ground electrode; and
   (f) a constant current supply having a current detector for detecting current that flows between the AC application electrodes in fluid reforming, the constant current supply supplying current to the polarity switching circuit so that the current value detected by the current detector constant.

2. A fluid reforming device, comprising;
   a container for fluid reforming having an inlet for introducing an unpurified fluid and an outlet for discharging a purified fluid; and
   the electrode block according to claim 1 stored in the container.

3. The electrode block according to claim 1, wherein the electrodes are formed of a porous material.

4. The fluid reforming device according to claim 2, wherein the electrodes are formed of a porous material.

\* \* \* \* \*